United States Patent [19]
Guerriero

[11] 3,938,822
[45] Feb. 17, 1976

[54] ADJUSTABLE TIE ROD ASSEMBLY

[75] Inventor: Charles P. Guerriero, Dearborn Heights, Mich.

[73] Assignee: Ford Motor Company, Dearborn, Mich.

[22] Filed: Oct. 4, 1974

[21] Appl. No.: 512,390

[52] U.S. Cl................... 280/95 R; 403/46; 403/44; 403/77
[51] Int. Cl............................................. B62d 7/16
[58] Field of Search............ 280/95 R, 95 I; 403/44, 403/46, 77, 118, 47

[56] References Cited
UNITED STATES PATENTS

| | | | |
|---|---|---|---|
| 1,550,672 | 8/1925 | Breeze | 403/77 X |
| 1,983,947 | 12/1934 | Rockwell | 280/95 R |
| 2,175,429 | 10/1939 | Chayne | 280/95 R |
| 2,340,300 | 2/1944 | Booth et al. | 403/46 |
| 2,650,106 | 8/1953 | French | 280/95 R |
| 2,678,226 | 5/1954 | Wright | 403/46 |
| 3,525,533 | 8/1970 | Mazur | 280/95 R |

FOREIGN PATENTS OR APPLICATIONS
421,989  1/1911  France.................. 403/44

*Primary Examiner*—Kenneth H. Betts
*Attorney, Agent, or Firm*—Clifford L. Sadler; Keith L. Zerschling

[57] ABSTRACT

An adjustable tie rod assembly for a motor vehicle steering linkage according to the present invention includes a tie rod having a threaded end, a ball joint with a split tubular attachment portion and a tubular intermediate member. The tubular portion of the joint has an internal thread. The intermediate member has both inner and outer threads. The threaded end of the tie rod, the intermediate member and the tubular portion of the joint are arranged in concentric fashion. The internal and external threads of the intermediate member are of right-hand and left-hand pitch whereby the intermediate member may be rotated to adjust the length of the assembly. Clamping means is provided for securing the three components in tight engagement.

2 Claims, 3 Drawing Figures

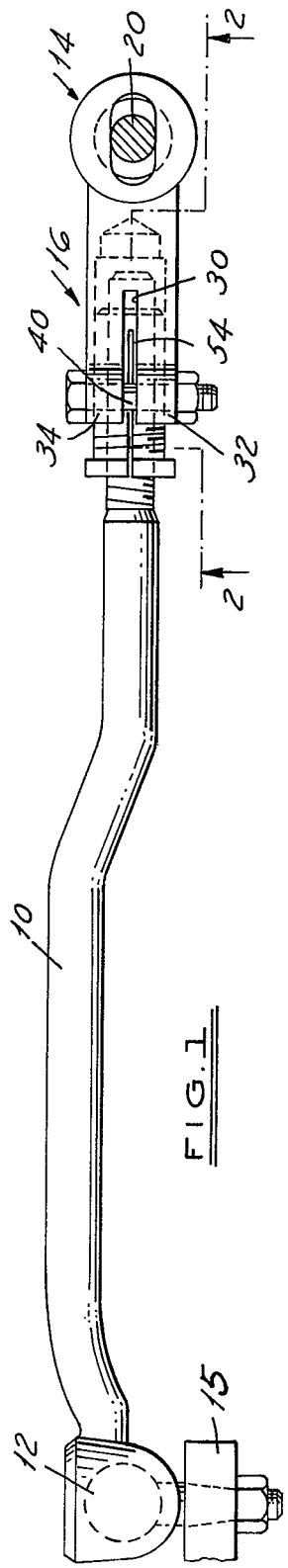
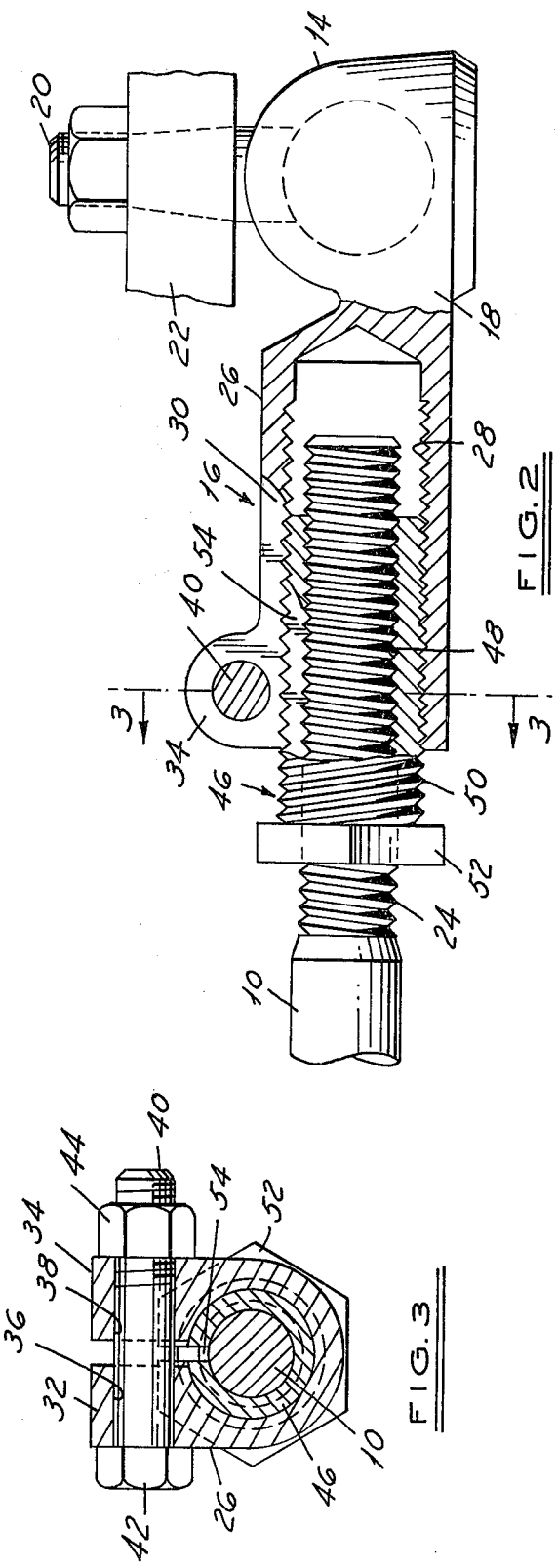

ADJUSTABLE TIE ROD ASSEMBLY

BACKGROUND OF THE DISCLOSURE

This invention relates generally to tie rod assemblies for motor vehicle steering linkage systems and more particularly to improved adjusting means therefor. It is desirable to adjust the length of a tie rod assembly in order to obtain the prescribed degree of toe-in of a vehicle's front wheels.

Tie rod assemblies conventionally employ turnbuckle adjustment means in which a sleeve member has internal threads at each of its end portions that engage threads on the ends of first and second rod elements. Adjustment of the overall length of the tie rod assembly is accomplished by rotating the turnbuckle sleeve in an appropriate direction. A pair of locking bolts are then tightened to secure the sleeve in position. This construction has the disadvantage that two locking bolts are required, one for each end of the sleeve and the further disadvantage that space limitations within the vehicle may prevent ready access to both locking bolts when it is desired to make an adjustment.

BRIEF SUMMARY OF THE DISCLOSURE

In view of the prior art, it is an object of the present invention to provide an adjustment means for a tie rod assembly that is characterized by its simplicity of construction and ease of manufacture. A tie rod adjustment means according to this invention is noted for its compact construction and the ease with which the adjustment can be performed.

In the presently preferred embodiment of the invention, a tie rod assembly includes a tie rod having a threaded end. A ball joint has a tubular extension with an internal thread. An intermediate member of generally tubular construction has both external and internal threads. The internal threads of the intermediate member and the mating threads of the rod end are of left-hand pitch. The external threads of the intermediate member and the mating threads of the tubular extension are of right-hand pitch. The tubular portion of the ball joint, the intermediate member and the threaded end of the rod are arranged in concentric fashion.

One end of the intermediate member has a tool receiving portion and when the member is rotated, the axial length of the assembly is changed. The intermediate member may be rotated in an appropriate direction and an appropriate number of turns to achieve the desired adjustment in the length of the tie rod assembly. In a steering linkage system the length of the tie rod assembly is adjusted in order to obtain a prescribed degree of front wheel toe-in.

The intermediate member has an axially extending slot. Similarly the tubular portion of the joint has an axially extending slot. A pair of radial flanges extend outwardly from either side of the slot in the joint. Aligned holes are provided in the flanges and a single bolt connects the flanges. When the bolt is tightened the tubular portion of the joint is contracted and a corresponding load is imposed upon the intermediate member causing it to contract. Therefore, the single bolt carried by the flanges of the joint provides a means for rigidly securing the tubular portion, the intermediate member and the threaded end of the rod in rigid engagement after the adjustment is made.

BRIEF DESCRIPTION OF THE DRAWINGS

The many objects and advantages of a tie rod assembly having an adjustment means in accordance with this invention will become apparent upon consideration of the following detailed discussion and the accompanying drawings, in which:

FIG. 1 is a plan view of a tie rod assembly having a unique adjustment means;

FIG. 2 is a side elevational view, partly in section, of the adjustment device taken along section line 2—2 of FIG. 1;

FIG. 3 is a sectional view taken along section line 3—3 of FIG. 2.

DETAILED DESCRIPTION OF THE PRESENTLY PREFERRED EMBODIMENT

Referring now to the drawings, wherein the presently preferred embodiment of this invention is illustrated, FIG. 1 discloses a tie rod assembly for a motor vehicle steering linkage system. The assembly of FIG. 1 includes a tie rod 10 that has a ball joint assembly 12 at one end. A ball joint assembly 14 is connected to the other end of the rod 10 by an adjustment means 16. Ball joint 12 connects the rod 10 to the steering arm 15 of a spindle for a front wheel.

The joint 14 includes a socket 18 that pivotally supports a ball stud 20. The ball stud 20 is connected to crosslink 22 of the vehicle steering linkage system. The crosslink 22 is connected to a steering gear. Thus, the tie rod assembly 10 provides a connection between the steering gear and the steering arm 15 of a vehicle steering system.

The adjustment means 16 according to this invention provides a device for adjusting the length of the tie rod assembly for the purpose of regulating the toe-in of the vehicle's front wheels.

The adjustment means 16 includes an externally threaded portion 24 on the end of the tie rod 10. These threads are of left-hand pitch. A tubular extension 26 is integrally connected to the socket portion 18 of the joint 14. The tubular extension 26 has internal screw threads 28 of right-hand pitch. The joint portion 26 is provided with an axially extending slot 30 that extends for the major portion of the axial length of the threads 28. A pair of generally radially extending flanges 32 and 34 protrude from the tubular portion 26 on either side of the slot 30.

The flanges 32 and 34 are provided with aligned drilled holes 36 and 38. A bolt 40 has its shank portion extending through the aligned holes 36 and 38 with a head 42 adjacent the flange 32 and a nut 44 adjacent the flange 34.

An intermediate member 46 has a generally tubular construction. The member 46 has an internal bore with left-hand screw threads 48 that mate with the threads 24 of the end of the rod 10. Right-hand threads 50 are formed on the exterior of the intermediate member 46. The threads 50 mate with the threads 48 of the tubular extension 26. The end of the intermediate member 46 is provided with a hexagonal tool receiving portion 52. A portion of the length of the intermediate member is split to form an axially extending slot 54.

OPERATION

The tie-rod assembly is shown in FIG. 1 in its fully assembled condition. The intermediate member 46 of the tie-rod assembly is threaded onto the end of the rod 10 and extension 26 of joint 14 is threaded onto the intermediate member 46 so that the extension 26, the intermediate member 46 and the end 24 of the rod 10 are arranged concentrically. When it is desired to make an adjustment in the total length of the tie rod assembly, a tool is used to grip the portion 52 and the intermediate member 46 is rotated. Due to the differential in the pitch between the internal and external threads 48 and 50, rotation of the member 46 will cause axial displacement of the joint 14 relative to the rod 10. This axial displacement may be either a lengthening or shortening of the rod assembly depending upon the direction in which the intermediate member 46 is rotated. In a steering linkage system the adjustment of the length of the tie rod assembly will adjust toe-in angle of the vehicle's front wheels.

After an adjustment is made, the nut 44 is tightened causing a reduction in the width of the slot 30. The tightening of the nut 44 will cause the tubular extension 26 to clamp the intermediate member and the intermediate member 46 in turn will be clamped upon the end of the rod 10 whereby a rigid interconnection will be provided. When the nut is tightened accidental rotation of the intermediate member 46 will be prevented.

In summary, an adjustable tie rod assembly according to the present invention is particularly characterized by its simplicity of construction and its compactness. The clamping bolt 40 and nut 44 are maintained in a fixed position with respect to the socket 14. Therefore, these elements may be located within the vehicle where they are readily accessible.

Unlike prior art designs only a single nut 44 need be loosened to permit rotation of the intermediate member 46 for adjustment purposes and only the single nut 44 need be tightened to prevent accidental rotation of that member.

The foregoing description presents the presently preferred embodiment of this invention. Details of construction have been disclosed for purposes of illustration and are not to be considered limits of the invention. Modifications and alterations may occur to those skilled in the art that will come within the scope and spirit of the following claims.

I claim:

1. An adjustable tie rod assembly comprising a rod, a joint and an intermediate member,
    said rod having an externally threaded end portion,
    said joint having a tubular extension with an internally threaded portion,
    said intermediate member having a generally tubular construction with an internally threaded portion engaging the end portion of said rod,
    said intermediate member having an externally threaded portion engaging the internally threaded portion of said tubular extension,
    said internally threaded portion of said intermediate member having a different pitch from the externally threaded portion of said intermediate member,
    said intermediate member having a tool receiving portion at one of its ends,
    said intermediate member being rotatable relative to said rod and said joint whereby the length of said tie rod assembly may be changed,
    said tubular extension having an axially extending slot whereby said tubular extension may be reduced in circumferential dimension when subjected to a clamping force,
    said intermediate member having an axially extending slot whereby said intermediate member may be reduced in circumferential dimension when subjected to a clamping force,
    clamping means engaging said tubular extension constructed to impose a clamping force on said tubular extension and said intermediate member whereby said intermediate member may be held against rotation relative to said rod and said joint,
    said clamping means comprising a first flange extending radially from said tubular extension on one side of said slot in said tubular extension and a second flange extending radially from said tubular extension on the other side of said slot in said tubular extension,
    said clamping means also including a threaded fastener extending between said first and second flanges and constructed to draw said flanges together when tightened.

2. A steering linkage system for a motor vehicle having means for adjusting front wheel toe-in,
    said linkage system including a crosslink, a wheel spindle steering arm and an adjustable tie rod assembly operatively interconnecting said cross link and said steering arm,
    said tie rod assembly comprising a rod, a joint and an intermediate member,
    said rod having an externally threaded end portion,
    said joint being connected to one of said cross-link or steering arm and having a tubular extension with an internally threaded portion,
    said intermediate member having a generally tubular construction with an internally threaded portion engaging the end portion of said rod,
    said intermediate member having an externally threaded portion engaging the internally threaded portion of said tubular extension,
    said internally threaded portion of said intermediate member having a different pitch from the externally threaded portion of said intermediate member,
    said intermediate member having a tool receiving portion at one of its ends,
    said intermediate member being rotatable relative to said rod and said joint whereby the length of said tie rod assembly may be changed,
    said tubular extension having an axially extending slot whereby said tubular extension may be reduced in circumferential dimension when subjected to a clamping force,
    said intermediate member having an axially extending slot whereby said intermediate member may be reduced in circumferential dimension when subjected to a clamping force,
    clamping means engaging said tubular extension constructed to impose a clamping force on said tubular extension and said intermediate member whereby said intermediate member may be held against rotation relative to said rod and said joint,
    said clamping means comprising a first flange extending radially from said tubular extension on one side of said slot in said tubular extension and a second flange extending radially from said tubular extension on the other side of said slot in said tubular extension,
    said clamping means also including a threaded fastener extending between said first and second flanges and constructed to draw said flanges together when tightened.

* * * * *